June 20, 1944.   E. J. A. LEJEUNE   2,351,981
DEVICE FOR THE MANUFACTURE OF GAS MASKS
Filed Nov. 16, 1939   6 Sheets-Sheet 1
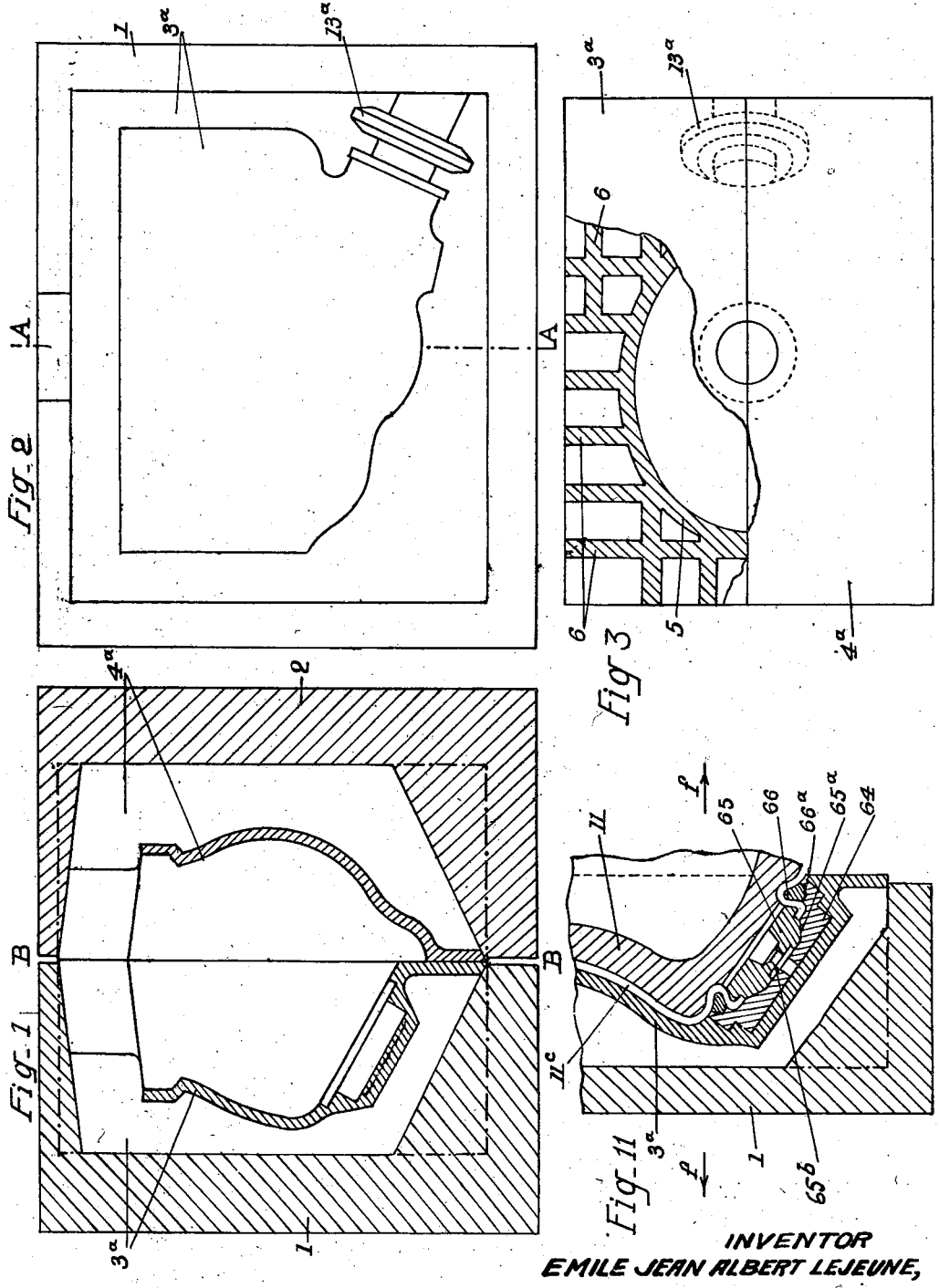
INVENTOR
EMILE JEAN ALBERT LEJEUNE,
BY Allen + Allen
ATTORNEYS June 20, 1944.                E. J. A. LEJEUNE                2,351,981
                  DEVICE FOR THE MANUFACTURE OF GAS MASKS
                  Filed Nov. 16, 1939            6 Sheets-Sheet 2
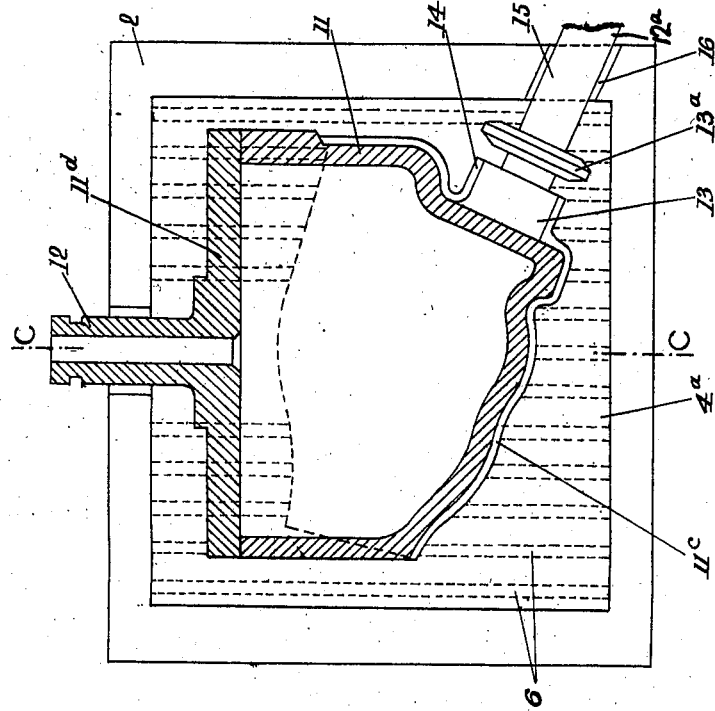
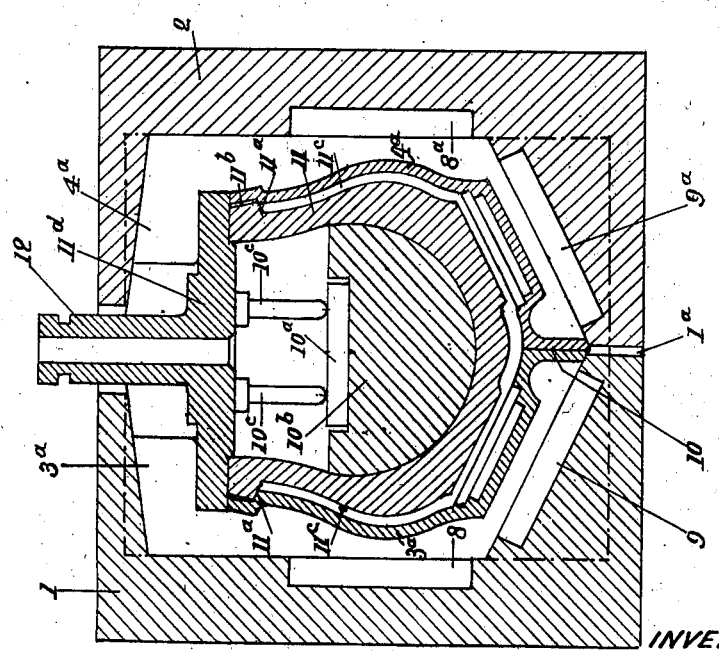
INVENTOR
EMILE JEAN ALBERT LEJEUNE,
BY Allen & Allen
ATTORNEYS

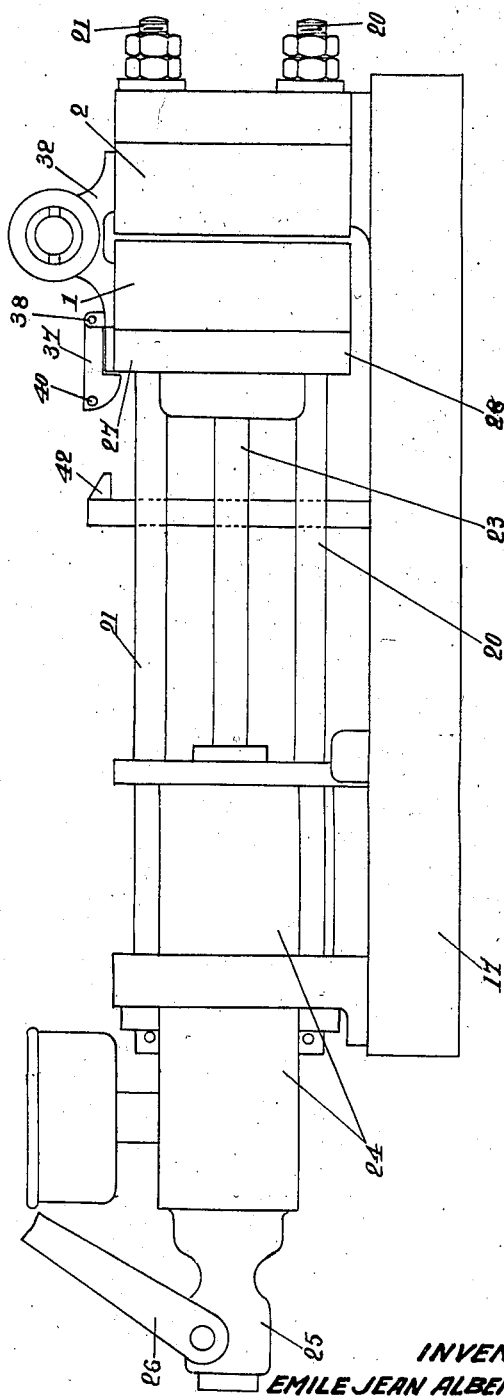

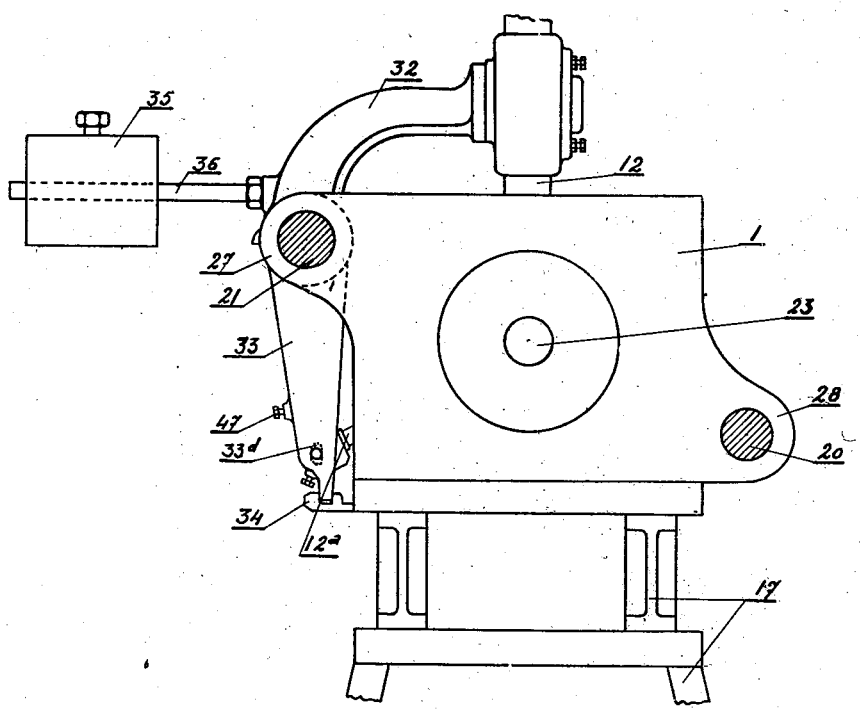
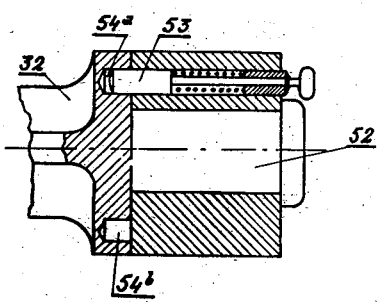

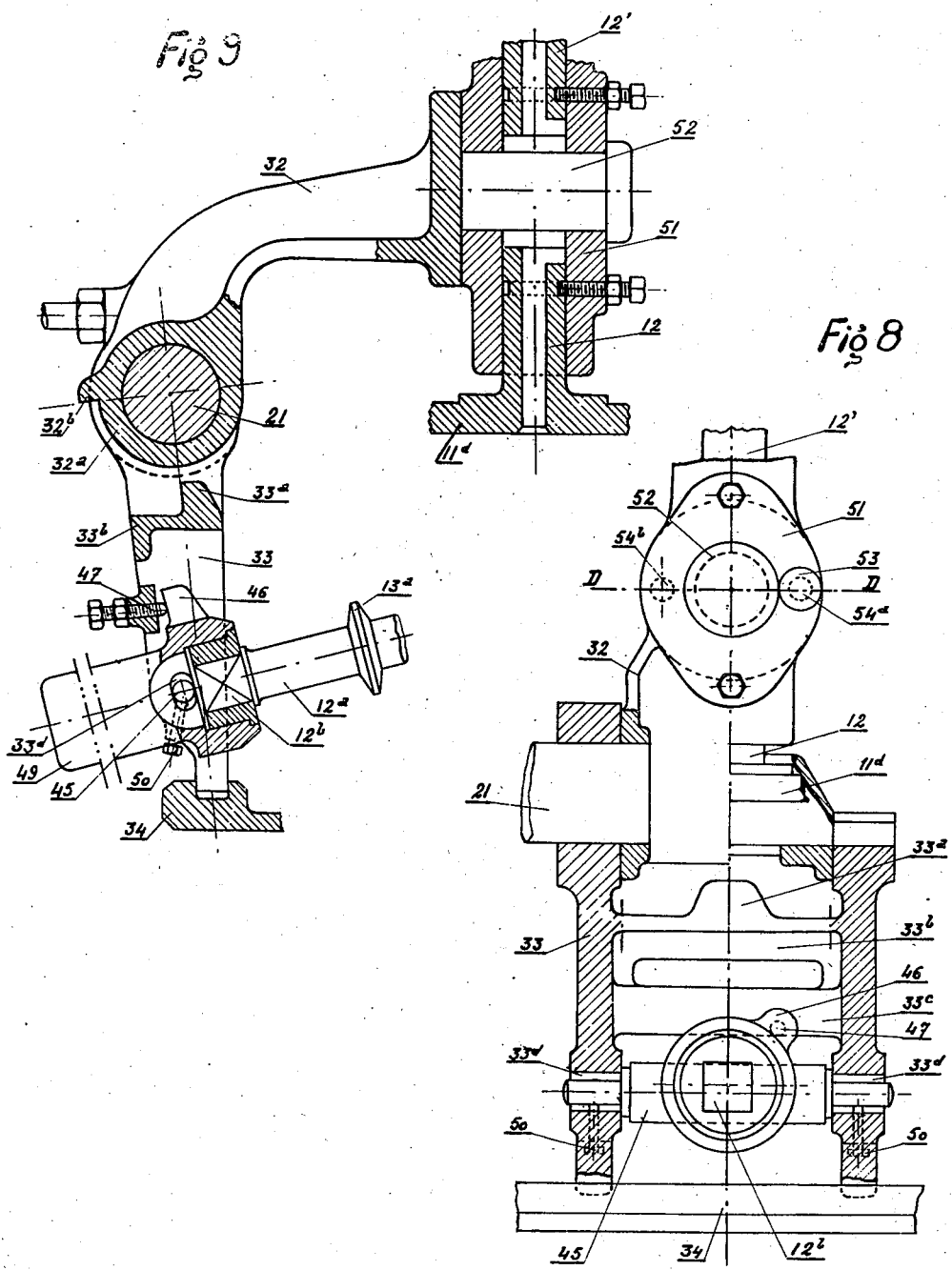

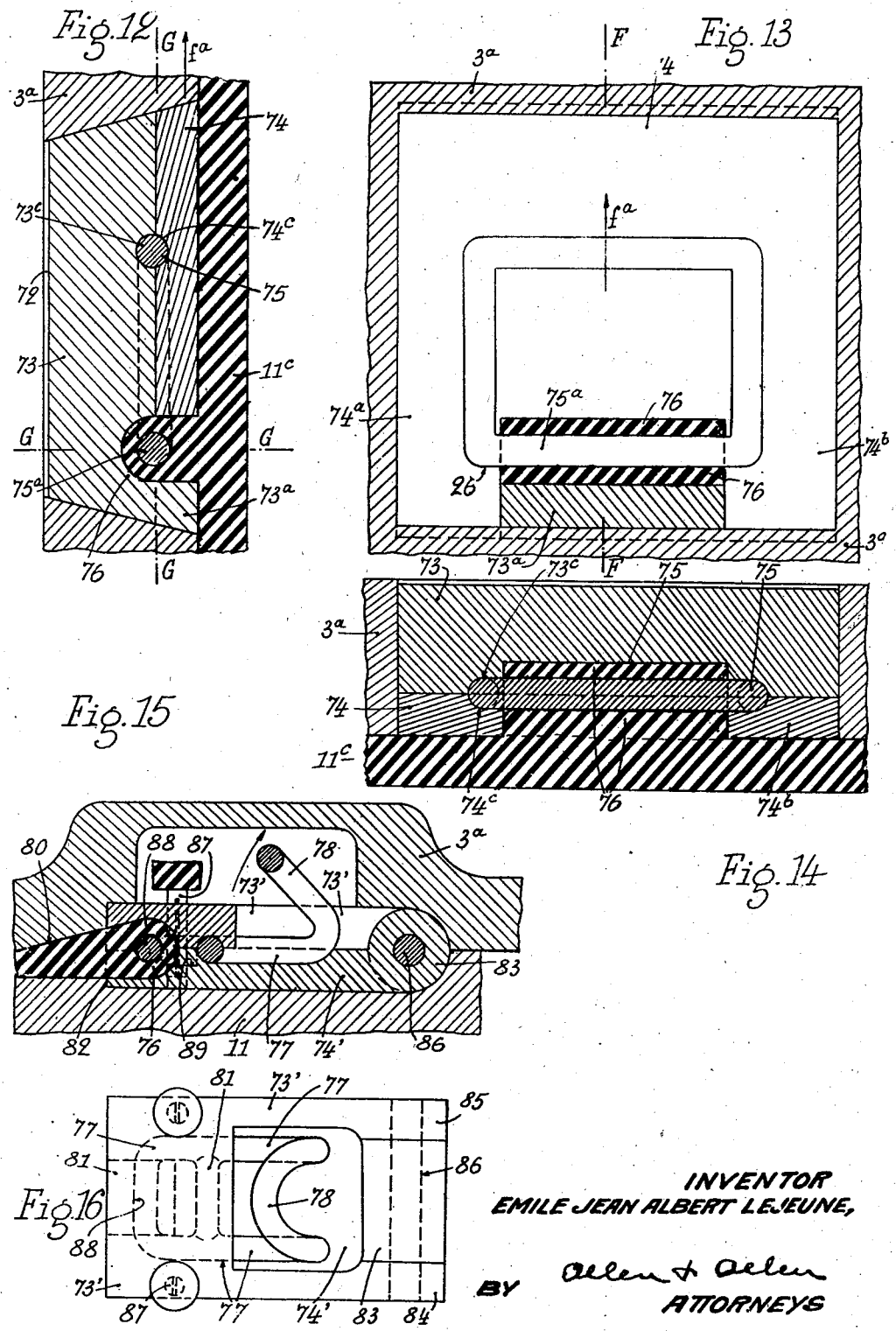

Patented June 20, 1944

2,351,981

UNITED STATES PATENT OFFICE 2,351,981

DEVICE FOR THE MANUFACTURE OF GAS MASKS

Emile Jean Albert Lejeune, Paris, France; vested in the Alien Property Custodian Application November 16, 1939, Serial No. 304,867
In France November 26, 1938

4 Claims. (Cl. 18—34)

Among the various processes used for the manufacture of gas masks through a moulding operation there is one which is a process by direct moulding of the mask in a mould and which consists in compressing a rubber sheet in the hot between, on the one hand, a core having approximately in relief the form of the inner part of the mask and, on the other hand, an outer mould formed of two—or more than two—parts which are themselves subdivided into segments which surround the core, these members of the mould (the inner and the outer one) being separated at the end of the compression operation owing to suitable stops, by a distance which corresponds to the thickness to be given to the mask, the different pieces of the mould being generally united by successive clamping operations and every one of the pieces acting on the adjacent one by compression. With such moulds it is intended to give, through the moulding operation itself, the desired shape to those parts of the mask which are designed for receiving the eyepieces as well as the different soles or stands and eventually the anti-vapor conduits and also for securing the buckles designed for receiving the fastenings of the mask onto the head. But the moulds which have been suggested or made for this purpose show the disadvantage that their construction is very intricated and that they are formed of a very large number of pieces owing to the necessities of the extraction of the mask and of the adhering pieces out of the mould, so that these moulds are expensive and delicate. They are difficult to assemble and to handle with precision owing to their weight and to their intricateness and also owing to their bulk. The buckles for the fastenings of the mask and the forks for manufacture of the anti-vapor conduits are badly secured therein with the further result that an important waste arises during the manufacture. The cost of the masks made according to these previous processes is thus very high, not only because of the above mentioned disadvantages, more particularly as regards the duration of the loading operation, but also owing to the long period of time which is necessary for bringing the whole of the mould to the vulcanization temperature. This long period of time for bringing the masks to the desired temperature can lead for certain parts of the mask to troublesome vulcanization irregularities.

The present invention has for its object a process for the manufacture of gas masks by a forming process through a direct moulding operation, which permits of making the moulding of the mask with a great rapidity, with a great reliability in the manufacture and at a substantially reduced cost. Another object of the invention is a moulding device which is simple in its constitution and which is formed of a reduced number of pieces being themselves simple in form and sturdy as well as able to be brought rapidly and with regularity to the desired temperature and which are further able to be readily disassembled for the extraction out of the mat of the mould. Its application, according to the invention offers the possibility of simple moulding operations leading to rapid and reliable operations without an irregular displacement of the pieces which form the mould, being likely to be feared. On the other hand, the said device permits of maintaining fast in a very accurate manner the buckles of the fastenings of the mask as well as the fork for the formation of the antivapor conduits.

An embodiment of the invention is shown by way of example in the accompanying drawings, in which:

Figure 1 shows an assembly of chills or shells and jaws according to the invention, adapted for the making of a mask, this unit being seen in a half sectional view through A—A of Figure 2 and in a half sectional view through a vertical plane leading through a diameter of an eyepiece.

Figure 2 shows a front sectional view through B—B of Figure 1.

Figure 3 is a plan view in which the chills or shells are partially broken out.

Figure 4 is a longitudinal sectional view of the whole unit of moulding elements showing the head or core in position in the chills or shells and an arrangement for supporting the fork designed for forming the vents or conduits for the eye-pieces.

Figure 5 is a sectional view through C—C of Figure 4 showing the arrangement of the heating elements of the mould.

Figure 6 is an elevational view on a smaller scale of a complete machine for making masks.

Figure 7 is an end view of the same.

Figure 8 is an elevational view with a partial sectional view of a fork carrier.

Figure 9 is an end view of the same.

Figure 10 is a horizontal sectional view through D—D of Figure 8.

Figure 11 is a sectional view of a particular arrangement permitting of insuring a ready extraction of the eyepieces out of the mould.

Figure 12 is a sectional view through F—F of Figure 13 of a moulding device for moulding projections for securing the fastenings or buckles of the mask body.

Figure 13 is a sectional view through G—G of Figure 12.

Figure 14 is a sectional view through H—H of Figure 12.

Figure 15 is a sectional view of a moulding device for moulding the hooks of the neck-band.

Figure 16 is a plan view of the same.

The mould shown in Figure 1 is formed of two jaws 1—2 in which chills or shells 3a—4a—which, in the following, will be called chills—are inserted in fixed positions, the said chills being each made here of a single piece but it would also be possible to make them of a plurality of pieces. The inner surface of the same corresponds to the outer form of the mask. Instead of being made in the form of thick pieces which are, for instance, made by a casting operation, which would entail serious difficulties owing to unequal shrinkage, the said chills are formed of an inner thin part such as 5, Figure 3, and of ribs 6 integral with the said inner part. Such a unit can be cast in metallic moulds and made, for instance, of light metal such as aluminum or aluminum alloys or any other known metals which are sufficiently resistant and able to be moulded by processes giving castings of a great accurateness, regular thickness and homogeneous structure. The castings obtained by such processes with metals of the kind as above referred to can thus be used in the raw state as they come out of the foundry or after having been subjected to a reduced machining operation limited to the plane surfaces which require a very great accurateness. The inner parts of the jaws may receive an exceedingly simple form, as for instance the form of a right-angled parallelopipedon which can be readily machined, as shown in chain dotted lines in the drawings, or of frusta of pyramids as shown in full lines and which can be obtained by moulding with subsequent lathing or mortising or even by means of plates having been preallably brought to the desired dimension by suitable known machining means and which are then welded together. Thus these jaws can receive chills the outer forms of which are rigorously similar but the inner forms of which are different and correspond, for instance, to masks of different forms or sizes.

The ribs 6 of the chills can be either arranged according to planes which are parallel one to another, as shown in the left part of Figure 3, or be in the form of blades which are perpendicular one to another and form a kind of network or honey-comb, as shown in the right part of Figure 3. Generally, it will be sufficient to make them in the form of parallel blades, since the unitary pressures in the moulding proper are comparatively low with respect to the resistance of the metal, even of soft metals such as aluminum. Besides their mechanical function as supporting and adjusting members for the chills in the jaws, the said ribs insure the transmission of the heat between the heating devices which will be described later on and the chills. It is to be noted that the chills showing the above mentioned characteristic features could be used in combination with moulding devices which are even different from the devices which will be described in the following.

A head or core which outwardly represents the inner form of the mask 11 is located between the chills 3a, 4a during the moulding operation. This head is formed in the same manner as the chills, that is to say it comprises a thin part of a substantially constant thickness forming through its outer surface the counter-moulding element with respect to the chills and eventually inner ribs which are similar to the ribs of the chills. In the moulding position, which is the position shown in Figure 5 the chills 3a and 4a come to rest against the parts 11a and 11b of the head and, on the other hand, they rest one against the other at 10. They are maintained in this position by the jaws 1—2 in which they are adjusted as above mentioned, a play 1a being provided between both jaws. It results from that arrangement that when the jaws 1 and 2 have been moved against each other as far as possible, a gap 11c is provided between the head 11 and the chills 3a—4a. This gap 11c corresponds to the thickness which the mask must have after cooking. The head 11 is maintained in its upper part by a steel plate 11d forming a strut able to prevent the head being brushed down and which comprises a rod 12 capable of being adjustably secured on a movable support (which will be described later on) in order to permit an adjustment which will be as accurate as possible of the head 11 with respect to the chills 3a—4a.

The heating elements are preferably formed of flat elements as shown in Figure 5. These flat elements such as 8, 9, 8a, 9a are located in recesses provided in the jaws 1 and 2. Another heating element such as 10a also secured in the head or core 11 by means of a shoe 10b of heat conducting material. Through pins 10c integral with the plate 11d the element 10a and the shoe 10b are maintained in their correct position. The said heating elements will be formed, for instance, of electric resistances which are arranged flat according to a well known method. It will be advantageous to select, for making the chills and the head or core, a metal having a high heat conductivity. In this respect aluminum, magnesium and their respective alloys possess properties which are particularly well suitable.

As shown in Figure 4, a support 12a is provided both for receiving a moulding element 13 serving for the formation of the base 14 of the mask and also for maintaining in position in the mould the fork designed for forming the anti-vapor conduits or vents of the eye-pieces. This support is formed of a rod 12a clamped between both chills 3a and 4a, Figure 5. The correct direction of this rod is ensured by a ring 13a which is located in two recesses provided in the chills 3a and 4a. The rearward end 15 of the fork extends through an opening 16 provided in the jaws 1 and 2 and is carried and guided by a fork-carrier which will be described later on.

The machine shown in Figures 6, 7, 8 and 9 is formed of a frame 17 carrying both jaws 1 and 2 of the mould which are united by two bars 20—21. The jaw 2 is fast (as well as the corresponding chill 4a), while the jaw 1 slides on the bars 20 and 21 and carries with it the chill 3a. Its longitudinal movement is ensured by the rod 23 of a hydraulic press 24 the actuating lever of the pump 25 of which is shown at 26. The half mould 1 is guided during its movement by means of ears 27—28 on the bars 20 and 21. The hydraulic press 24 comprises a double-acting cylinder with a rapid approaching movement which permits of rapidly setting the half mould 1 either in order to move it away from the half mould 2 or for approaching it towards the same, and of finally effecting the pressure between the said both half moulds for the moulding operation and the vulcanization.

Slidably mounted on the rod 21, simultaneously with the half mould 1, are an arm 32 pivotally secured for swivelling about the said rod 21, and a bail 33 (Figures 8 and 9) the legs of which are mounted on both sides of the pivoting arm 32 and guided in their lower part by a guideway 34 fast with the frame 17. The pivoting arm 32 receives the vertical rod 12 which carries the head or core 11 by means of the plate 11d (Figure 4). The whole unit formed of the pivoting arm 32, the rod 12 and the core or head 11 is balanced by means of a counter-weight 35 secured on a rod 36 (Figure 7) or on a rearward extension of the arm 32.

The pivoting arm 32 is united by a hook 37 pivotally secured at 38 on the half mould 1 with the ear 27. This hook has a lateral extension 40 which—when the half mould 1 has moved towards the left side of the drawing by a quantity which is sufficient that the head 11 has cleared off the half mould 2—abuts against a stop 42 having a sloping surface and which is secured to the frame of the machine. This sloping surface raises the hook 37 by means of the extension 40 and discharges the arm 32 from the ear 27 and, accordingly, from the half mould 1. Thus the latter can continue its movement towards the left side until it also clears off the head 11. It is then sufficient to raise the pivoting arm 32 by causing it to rock about the rod 21 for completely disengaging the head 11 and raising it over both half moulds. On the hub 32a of the arm 32 is provided a projection 32b to which corresponds a stop 33a on a cross-rod 33b of the bail or strap 33, in order to limit the angular displacement of the arm 32 during this disengaging movement.

In its lower part the bail or strap 33 carries the fork-carrier 12a by means of a stud 45. A finger 46 fast with the stud 45 comes to rest against an adjustable stop 47 formed, for instance, of a screw carried by a strut 33c of the strap 33. This stop permits of correctly giving the desired direction to the fork-carrier 12a with respect to the strap 33. The support 12a carries a bi-conical ring 13a which can be clamped between two corresponding grooves of the half moulds 3a and 4a (Figure 4), while the whole is balanced by a counter-weight 49. The arm 12a is mounted in the stud 45 by a square part 12b. The bearing surfaces 33d of the stud 45 in the arms of the strap 33 are ovalized and setting screws 50 permit of giving the stud 45 in the said bearing surfaces and accordingly to the support 12a positions which are more or less high corresponding to different dimensions of the mask and to different mould sizes.

The operation of the machine is as follows: The half mould 1 is brought to the left side of the machine by means of the jack 24 while simultaneously carrying with it the arm 32 and accordingly the head 11 as well as the strap 33 by means of the hook 37. When the head is brought to such a position that it should be disengaged from the half mould 2, the hook 37 is raised by the stop 42, Figure 6, and the half mould 1 clears the head 11. The operator raises the head by causing the arm 32 to upwardly rock about the rod 21 and he loosens from the head 11 the mask which has been thus formed. Fresh rubber sheets are put into the chills or they are put onto the head, after the accompanying dismountable pieces provided on both parts of the mould have been brought to their position, for moulding the eye-pieces and the fastenings of the buckle parts of the mask as will be described later on. Then the head is brought again to its lower position and the jack 24 is acted upon so as to push the jaw 1 towards the jaw 2. During this movement the hook 37 moves away from its stop 42 and falls again onto the ear 27. The hook 37 will finally occupy its clamping position when the jack 24 will have compressed the rubber and when the chills 3a and 4a will be perfectly united by their bearing portions. The mould being then heated the vulcanization operation will take place. Once the heating is achieved the head is raised in the above described manner. It is to be noted that it is possible, owing to the great facility of handling of the machine constructed according to the invention, to let this handling be effected by a female worker.

Instead of a single head 11 a plurality of heads can be advantageously arranged on the arm 32. Figures 8 and 9 show the case of two symmetrically arranged heads. In this case the boss 51 which carries the rod 12 is pivotally mounted on the end 52 of the arm 32 and a rod 12' opposed to the rod 12 and mounted on the support 51, carries the second head. A latch 53 of known type (Figure 10) to which correspond two diametrally opposed holes 54a, 54b in the arm 32 permits of interlocking the rotating support 51 with the arm 32 so that it may be possible to bring at will either the arm 12 or the arm 12' downwardly. Such a device with a plurality of heads offers great advantages. It permits especially of effecting the furnishing of the moulds in advance for securing the buckle-parts and of reducing the time which is necessary for loading the apparatus. On the other hand, it permits of stripping from the head the mask which has just been vulcanized only when another head has been brought to its position and when the machine has been started again, which also represents an important gain of time and offers the possibility of having the work of a plurality of machines surveyed by only a female worker in spite of the very short time which is necessary for the vulcanization.

The device for the formation of the eye-pieces as shown in Figure 11 (for one of the eye-pieces) permits of forming the chills 3a and 4a of two principal pieces abutting together according to the symmetry plane of the mask. This device comprises, for each eye-piece, a steel casing 64 which is secured in a corresponding recess of the chill proper (as, for instance, 3a) and a core 65. The contact surface 65a of the core 65 and of the casing 64 shows a conicity corresponding to an angle which is so great that it permits of without counter-draw, the separation of the pieces during the withdrawing from the mould which is effected through a relative displacement of the chill 3a and of the head 11 according to the arrows f, the core 65 remaining fast with the head with the body of the mask. Once the head 11 is completely disengaged and the mask stripped from this head, it is sufficient to expel the core 65 outwardly. At 66 is shown the ring to the eye-piece which shows a conical part 66a which, during the preparation of the mould, adjusts itself in a corresponding recess of the casing 64.

For the direct fastening of each buckle for fastening the mask on its body, the chill 3a (what is said here for this chill applies also to the chill 4a) is provided (Figures 12, 13 and 14) at each suitable place with a recess 72 in which a set of two small plates 73—74 is located which rest against one another. The small plate 73 comprises a part 73a which extends downwards until the inner surface of the chill 3a between the two legs 74a and 74b of the small plate 74. The lower face of this small plate 74 thus forms an extension of the inner surface of the chill 3a. The small plate 74 is provided with a hollowed part 74c designed for receiving and clamping the buckle 75 in combination with a corresponding hollowed part 73c of the small plate 73. The recess 76 which is thus formed between the small plates 73 and 74 is filled up by the molten rubber when the latter rises into the said recess under the action of the pressure. As the leg 75a of the buckle extends through this recess, the said leg is entirely surrounded with rubber after the formation of the mask, which rubber forms an extension of the mask proper 11c and thus connects the leg 75a with the said mask. The leg 75a of the buckle will be provided, or not, at the place where the rubber is to surround it, with a fabric preallably impregnated with a rubber solution or a solution of equivalent products. For stripping from the mould the jaws are opened and the small plates 73—74 carried with the mask move away from their recess in the chill 3a, the resting surfaces of the said small plates in the said recess showing a direction which is suitable for readily permitting of this disengagement because it has no counter-draw. Then the small plate 73 is drawn out and the small plate 74 is pulled in the direction of the arrow fa after the buckle 75 has been raised.

For securing the fastening buckles provided on the edges of the body of the face-cover, a device such as the one shown in Figures 15 and 16 can be used. This device is generally identical with the preceding one with the exception that the upper small plate (here 73') which encloses the buckle and forms the mould for the rubber at 76, is hinged on the lower small plate 74'. As shown in Figures 15 and 16 the operation to be effected consists in securing to the mask a hook 77 the portion 78 of which will be brought down after the moulding of the mask. The lower small plate 74' inserted in the head 11 is recessed for receiving the buckle 77 and for forming at 81 the other part of the mould for the rubber 82; on the part 83 is pivotally secured by two ears the upper small plate 73'. The latter is recessed for giving way to the raised part 78 of the hook. The recess is large enough for permitting the small plate 73' of rocking about the stud 86 without fouling the hook 78. Elastic pins such as 87 ensure the locking of the upper small plate 73' against the lower small plate 74'. The whole is maintained in its position by the chill 3a or 4a which rests on the upper small plate. During the moulding of the mask the rubber enters at 82 the space 76 and surrounds the leg 88 of the hook. When the piece is a flat buckle it is not necessary to provide a recess in the upper small plate except eventually for the discharge of the excess of rubber.

In another form of execution a cavity 89 can be provided in the lower small plate 74', this cavity being able to form a release chamber for the rubber and to prevent the latter of forming, by moving the small plates 73' and 74' away from another, a rubber wall which it would be difficult to remove.

It is to be noted that it would be possible, without departing from the scope of the present invention, to operate the above mentioned devices by using, for forming the mask, instead of rubber sheets, rubber or any other natural or synthetic plastic material injected under pressure into the interval provided between the head and the chills, the jaws being preallably brought together and maintained simply closely pressed against one another by a suitable locking device.

What I claim is:

1. A device for molding gas masks comprising a pair of hollow pieces forming jaws, means for bringing the said jaws together and for separating them from each other, removable shells adjusted in the said jaws, the inner faces of which correspond to the outer surface of the mask to be molded, a core, the outer surface of which corresponds to the inner surface of the mask to be molded, and heating means for bringing the shells and the core to the vulcanization temperature of the mask material, the lateral faces through which the shells rest against each other in the position in which the jaws are brought together being formed of planes which define on the mask surfaces and have no counter-draw parts with respect to the direction of movement through which the jaws carrying the said shells are separated from each other, said core being adjustably fixed on a support rocking about a stud parallel to the direction of the movement of the jaws, in order that it may be brought between the said jaws and released from the latter, the said rocking support being so mounted that it moves parallel to the direction of the movement of the jaws, and including means for temporarily connecting the said support with one of the jaws so that the core accompanies the said jaw during a portion of its movement, and means for releasing the said support from the said jaw during the remainder of the movement of the said jaw.

2. A device for moulding rubber gas masks according to claim 1, in which a core is provided for moulding anti-vapor conduits on the mask, the said core possessing outwardly of the jaws a lateral extension comprising a rod fixed on a support which is itself pivotally mounted on a strap movable parallel to the direction of the movement of the jaws, and including means for the adjustment of the angular position of the said support with respect to the said member.

3. A device for moulding rubber gas masks according to claim 1, in which a device is provided for moulding the parts of the mask adapted for fixing the fastening buckles for the mask, the said device comprising for each buckle a set of two small plates arranged one above another and located in the corresponding shell, the lower small plate being provided with a recess for receiving one half of the buckle, a recess for moulding the rubber which is intended to surround the buckle and a recess for the passage of a projection provided on the upper small plate, the said upper small plate having a cavity for the other half of the buckle, a cavity for the rubber which is intended for surrounding the buckle and a projection which engages the corresponding recess of the lower small plate and closes the said cavity provided for the rubber.

4. A device for moulding rubber gas masks according to claim 1, in which a device is provided for moulding the parts of the mask adapted for fixing the fastening buckles located on the edge of the mask body, the said device being secured on the core and comprising, for each buckle, two small plates pivotally connected with one another, means for maintaining the said small plates applied against one another, each of said plates being provided with a recess for receiving a portion of the buckle for centering the same and a recess for moulding the rubber which is intended to surround the buckle.

EMILE JEAN ALBERT LEJEUNE.

Certificate of Correction

Patent No. 2,351,981.

June 20, 1944.

EMILE JEAN ALBERT LEJEUNE

It is hereby certified that error appears in the above numbered patent requiring correction as follows: Page 1, first column, line 1, beginning with "Among the various" strike out all to and including the word and period "device.", page 4, first column, line 72, comprising the printed specification, and insert instead the following—

Among the various processes used for the manufacture of gas masks by moulding, there is one which is a process of direct moulding of the mask in a mould, and which consists in compressing a rubber sheet in heated condition between, on the one hand, a core having approximately in relief the form of the inner part of the mask and, on the other hand, an outer mould formed of two—or more than two—parts which are themselves subdivided into segments which surround the core. These members of the mould (the inner and the outer one) are held apart at the end of the compression operation by suitable stops, with a separation which corresponds to the thickness to be given to the mask, the different pieces of the mould being generally united by successive clamping operations and each of the pieces acting on an adjacent one by compression. With such moulds it is intended to give, through the moulding operation itself, the desired shape to those parts of the mask which are designed for receiving the eye-pieces, as well as other different required configurations, and finally the anti-vapor conduits, and also members for securing the buckles designed for receiving the fastenings of the mask onto the head. But the moulds which have been suggested or made for this purpose have the disadvantage that their construction is very intricate and that they are formed of a very large number of pieces owing to the necessity of the extraction of the mask and of the adhering pieces from the mould, so that these moulds are expensive and delicate. They are difficult to assemble and to handle with precision owing to their weight and to their intricacy, and also owing to their bulk. The buckles for fastening the mask and the parts forming the anti-vapor conduits are poorly secured therein with the further result that considerable waste arises during the manufacture. The cost of the masks made according to these previous processes is thus very high, not only because of the above mentioned disadvantages, more particularly as regards the duration of the loading operation, but also owing to the long period of time which is necessary for bringing the whole of the mould to the vulcanization temperature. This long period of time for bringing the masks to the desired temperature can lead to troublesome vulcanization irregularities for certain parts of the mask.

The present invention has for its object a process for the manufacture of gas masks by a direct moulding operation, which permits of carrying on the moulding of the mask with great rapidity, with great reliability in the manufacture and at a substantially reduced cost. Another object of the invention is a moulding device which is simple in its constitution and which is formed of a smaller number of pieces. The pieces themselves are simple in form and sturdy, as well as capable of being brought rapidly and with regularity to the desired temperature. They are further capable of being readily disassembled for stripping purposes. The invention makes possible the use of simple moulding operations without the danger of irregular displacement of the pieces which form the mould. My device enables me to fix the buckles of the fastenings of the mask as well as the part for the formation of the anti-vapor conduits in a very accurate manner.

An embodiment of the invention is shown by way of example in the accompanying drawings, in which:

Figure 1 shows an assembly of mould shells and jaws according to the invention, adapted for the making of a mask, this unit being seen partly in cross-section along the line A—A of Figure 2, and partly in cross-section in a vertical plane passing through the center of an eye-piece.

Figure 2 is a cross-sectional view taken on the line B—B of Figure 1.

Figure 3 is a plan view of the mould with parts in section.

Figure 4 is a longitudinal sectional view of the whole unit of moulding elements showing the head or core in position in the shells, and an arrangement for supporting the part designed for forming the vents or conduits for the eye-pieces.

Figure 5 is a sectional view along the line C—C of Figure 4 showing the arrangement of the heating elements of the mould.

Figure 6 is an elevational view on a smaller scale of a complete machine for making masks.

Figure 7 is an end view of the same.

Figure 8 is an elevational view with parts in section.

Figure 9 is an end view of the same.

Figure 10 is a horizontal sectional view along the line D—D of Figure 8.

Figure 11 is a sectional view of an arrangement of parts permitting a ready extraction of the eye-pieces from the mould.

Figure 12 is a sectional view along the line F—F of Figure 13 of a moulding device for moulding projections for securing the fastenings or buckles of the mask body.

Figure 13 is a sectional view along the line G—G of Figure 12.

Figure 14 is a sectional view along the line H—H of Figure 12.

Figure 15 is a sectional view of a moulding device for moulding the hooks of the neck-band.

Figure 16 is a plan view of the same.

The mould shown in Figure 1 comprises two jaws 1, 2, in which mould shells 3a, 4a, are inserted in fixed positions. Each of the said shells is, in this embodiment, made of a single piece, but it would also be possible to make them of a plurality of pieces. The inner surface of the shells corresponds to the outer form of the mask to be moulded. Instead of being made in the form of thick pieces which are, for instance, castings, (which would entail serious difficulties owing to unequal shrinkage), the said shells comprise an inner thin part such as 5, Figure 3, and of ribs 6 integral with the said inner part. Such a unit can be cast in metallic moulds and made, for instance, of light metal such as aluminum or aluminum alloys or any other known metals which are sufficiently resistant and capable of being moulded by processes giving accurate castings of regular thickness and homogeneous structure. The castings obtained by such processes, with metals of the kind above referred to, can thus be used as they come out of the foundry, or after having been subjected only to a minor machining operation, limited to the plane surfaces which require a very great accuracy. The inner parts of the jaws may have an exceedingly simple form, as for instance, the form of a right-angled parallelepipedon which can be readily machined, as shown in chain dotted lines in the drawings, or of frusta of pyramids as shown in the full lines. These forms can be obtained by moulding with subsequent machining. The jaws can even be made of plates which have been previously brought to the desired dimensions by suitable machining operations, and which are then welded together. Thus, these jaws can receive shells the outer forms of which are all the same, but the inner forms of which are different and correspond, for instance, to masks of different forms or sizes.

The ribs 6 of the shells can be either arranged in planes which are parallel one to another, as shown in the left part of Figure 3, or in the form of blades which are perpendicular one to another and form a kind of network or honey-comb, as shown in the right part of Figure 3. Generally, it will be sufficient to make them in the form of parallel blades, since the unit pressures in the mould proper are comparatively low with respect to the resistance of the metal, even of soft metals such as aluminum. Besides their mechanical function as supporting and adjusting members for the shells in the jaws, the said ribs insure the transmission of the heat between the heating devices which will be described later on and the shells. It is to be noted that the shells showing the above mentioned characteristic features could be used in combination with moulding devices which are different from the devices which will be described hereinafter.

A head or core which outwardly conforms to the inner shape of the mask 11 is located between the shells 3a, 4a, during the moulding operation. This head is formed in the same manner as the shells, that is to say it comprises a thin part of a substantially constant thickness, the outer surface of which forms the counter-moulding element with respect to the shells, and inner ribs which are similar to the ribs of the shells. In the moulding position, which is the position shown in Figure 5, the shells 3a and 4a come to rest against the parts 11a and 11b of the head and, also, they rest against each other at 10. They are maintained in this position by the jaws 1, 2, in which they are adjusted as above mentioned, play, as at 1a, being allowed between the jaws. It results from this arrangement that when the jaws 1 and 2 have been moved against each other as far as possible, a gap 11c is provided between the head 11 and the shells 3a, 4a. This gap 11c corresponds to the thickness which the mask must have after moulding or vulcanizing. The head 11 is supported in its upper part by a steel plate 11d forming a strut which prevents the head from being crushed down and which comprises a rod 12 adjustably secured on a movable support (which will be described later on) in order to permit an adjustment of the head 11 with respect to the shells 3a, 4a, which will be as accurate as possible.

The heating elements are preferably formed of flat elements as shown in Figure 5. These flat elements such as 8, 9, 8a, 9a are located in recesses provided in the jaws 1 and 2. Another heating element such as 10a, is also secured in the head or core 11 by means of a shoe 10b of heat conducting material. The element 10a and the shoe 10b are maintained in their correct position by pins 10c integral with the plate 11d. The heating elements may be formed, for example, of electric resistances which are arranged flat in known manner. It will be advantageous to select a metal having a high heat conductivity for making the shells and the head or core. In this respect aluminum, magnesium and their respective alloys possess properties which are particularly suitable.

As shown in Figure 4, a support 12a is provided both for receiving a moulding element 13 serving for the formation of the base 14 of the mask and also for maintaining in position in the mould the part (hereinafter called fork) designed for forming the anti-vapor conduits or vents of the eyepieces. This support comprises a rod 12a clamped between both shells 3a, and 4a, Figure 5. The correct position of this rod is ensured by a ring 13a which is located in two recesses provided in the shells 3a and 4a. The rearward end 15 of the fork extends through an opening 16 provided in the jaws 1 and 2 and is carried and guided by a fork-carrier which will be described later on.

The machine shown in Figures 6, 7, 8 and 9 is formed of a frame 17 carrying both jaws 1 and 2 of the mould which are united by two bars 20, 21. The jaw 2 is fixed (as well as the corresponding shell 4a), while the jaw 1 slides on the bars 20 and 21 and carries with it the shell 3a. Its longitudinal movement is ensured by the rod 23 of a hydraulic cylinder 24, which is provided with a pump 25 having an actuating lever at 26. The half mould 1 is guided during its movement by means of ears 27, 28, on the bars 20 and 21. The hydraulic cylinder 24 is a double-acting cylinder providing a rapid movement of the half mould 1 in either direction, and finally effecting the pressure between both mould parts for the moulding operation and for vulcanization.

Also, slidably mounted on the rod 21 with the half mould 1, are an arm 32 pivotally secured for swivelling about the said rod 21, and a bail 33 (Figures 8 and 9) the legs of which are mounted on both sides of the pivoting arm 32 and guided in their lower part by a guide-way 34 fixed to the frame 17. The pivoting arm 32 receives the vertical rod 12 which carries the head or core 11 by means of the plate 11d (Figure 4). The whole unit formed of the pivoting arm 32, the rod 12 and the core or head 11 is balanced by means of a counter-weight 35 secured on a rod 36 (Figure 7) or on a rearward extension of the arm 32.

The pivoting arm 32 is connected with the ear 27 by a hook 37 pivotally secured at 38 on the half mould 1. This hook has a lateral extension 40 which, when the half mould 1 has moved towards the left side of the drawing by an amount which is sufficient for the head 11 to clear the half mould 2, abuts against a stop 42 having a sloping surface and which is secured to the frame of the machine. This sloping surface raises the hook 37 by means of the extension 40 and disengages the arm 32 from the ear 27 and, therefore, from the half mould 1. Thus, the latter can continue its movement towards the left side until it also clears the head 11. It is then sufficient to raise the pivoting arm 32 by causing it to rock about the rod 21 to completely disengage the head 11 and raise it over both half moulds. A projection 32b is provided on the hub 32a of the arm 32, corresponding to a stop 33a on a cross-rod 33b of the bail or strap 33 (Figure 9), in order to limit the angular displacement of the arm 32 during this disengaging movement.

In its lower part the bail or strap 33 carries the fork-carrier 12a by means of a stud 45. A finger 46 fixed to the stud 45, comes to rest against an adjustable stop 47, for instance, a screw, carried by a strut 33c of the strap 33. This stop permits of correctly giving the desired direction to the fork-carrier 12a with respect to the strap 33. The support 12a carries a biconical ring 13a which can be clamped between two corresponding grooves of the half moulds 3a and 4a (Figure 4), while the whole is balanced by a counter-weight 49. The arm 12a is mounted in the stud 45 by a square part 12b. The bearing surfaces 33d of the stud 45 in the arms of the strap 33 are ovalized and set-screws 50 permit of giving the stud 45 different positions in the said bearing surfaces, and hence raising or lowering the support 12a for different dimensions of the mask and different mould sizes.

The operation of the machine is as follows: The half mould 1 is brought to the left side of the machine by means of the cylinder 24 carrying with it the arm 32, the head 11, as well as the strap 33 (by means of the hook 37). When the head is brought to such a position that it should be disengaged from the half mould 2, the hook 37 is raised by the stop 42, Figure 6, and the half mould 1 clears the head 11. The operator raises the head by causing the arm 32 to rock upwardly about the rod 21, and he strips from the head 11 the mask which has already been moulded. Fresh rubber sheets are put into the shells, or they are put onto the head, after the accompanying removable pieces provided on both parts of the mould for moulding the eye-pieces and the fastenings of the buckle parts of the mask, have been positioned as will be described later. Then the head is brought again to its lower position and the cylinder 24 operates to push the jaw 1 towards the jaw 2. During this movement the hook 37 moves away from its stop 42 and falls again onto the ear 27. The hook 37 will finally occupy its clamping position when the cylinder 24 has compressed the rubber and when the shells 3a and 4a have come together completely. The mould being then heated, the vulcanization operation will take place. Once the heating is finished, the mould parts are separated and the head is raised in the above described manner.

Instead of a single head 11 a plurality of heads can be advantageously arranged on the arm 32. Figures 8 and 9 show an example of two symmetrically arranged heads. In this case the boss 51 which carries the rod 12 is pivotally mounted on the end 52 of the arm 32, and a rod 12' opposed to the rod 12 and mounted on the support 51, carries the second head. A latch 53 of known type (Figure 10), cooperating with two diametrically opposed holes 54a, 54b, in the arm 32, permits of interlocking of the rotating support 51 with the arm 32 so that either the arm 12 or the arm 12' may be selectively brought downwardly. Such a device with a plurality of heads offers great advantages in that it permits the moulds to be furnished in advance with parts for securing the buckle, and reduces the time necessary for loading the apparatus. On the other hand, it permits of stripping from the head the mask which has just been vulcanized while another head is in moulding position, and the machine is operating. This also represents an important gain of time and makes it possible for a single worker to tend a plurality of machines in spite of a short vulcanizing time.

The device for the formation of the eye-pieces as shown in Figure 11 (for one of the eye-pieces) makes it possible to form the shells 3a and 4a of two principal pieces abutting together along the plane of symmetry of the mask. This device comprises, for each eye-piece, a steel casing 64 which is secured in a corresponding recess of the shell proper (as, for instance, 3a) and a core 65. The contact surfaces 65a of the core 65 and of the casing 64 are conical, and have such a great angularity that the parts may be separated without counter-draw, and such that the part 65 may be withdrawn from the shell with the head 11 in the direction of the arrows f. Once the head 11 completely is disengaged from the mould shell, and the mask stripped therefrom, the part 65 may be removed from the mask outwardly. At 66 is shown the ring for the eye-piece which is provided with a conical part 66a which, during the preparation of the mould, adjusts itself in a corresponding recess of the casing 64.

For the direct fastening of each buckle, the shells 3a and 4a are provided (Figures 12, 13 and 14) at appropriate places with recesses 72 in which two small plates 73, 74, are located, said plates resting against one another. The small plate 73 has a part 73a which extends downwards to the inner surface of the shell 3a between the two legs 74a and 74b of the small plate 74. The lower face of this small plate 74 thus forms an extension of the inner surface of the shell 3a. The small plate 74 is provided with a hollowed part 74c designed to receive and clamp the buckle 75 in cooperation with a corresponding hollowed part 73c of the small plate 73. The recess 76 which is thus formed between the small plates 73 and 74 is filled up by the molten rubber when the latter rises into the said recess under pressure. As the leg 75a of the buckle extends through this recess, the said leg is entirely surrounded with rubber after the formation of the mask, which rubber forms an extension of the mask proper 11c and thus connects the leg 75a with the said mask. The leg 75a of the buckle may or may not be provided, at the place where the rubber is to surround it, with a fabric preferably impregnated with a rubber solution or a solution of equivalent products. For stripping the mould the jaws are opened, and the small plates 73, 74, are carried with the mask away from their recesses in the shell 3a. It will be understood that the surfaces of the said small plates which engage in the said recesses are so shaped as to permit ready disengagement. Then the small plate 73 is drawn out and the small plate 74 is pulled in the direction of the arrow fa after the buckle 75 has been raised.

For securing the fastening buckles provided on the edges of the body of the face-cover, a device such as the one shown in Figures 15 and 16 can be used. This device is generally identical with the preceding one with the exception that the upper small plate (here 73') which encloses the buckle and forms the mould for the rubber at 76, is hinged on the lower small plate 74'. As shown in Figures 15 and 16 the operation to be effected consists in securing to the mask a hook 77 the portion 78 of which will be brought down after the moulding of the mask. The lower small plate 74' inserted in the head 11 is recessed for receiving the buckle 77 and for forming at 81 the other part of the mould for the rubber 82; the upper small plate 73' is pivotally secured by two ears on the part 83. The latter is recessed to accommodate the raised part 78 of the hook. The recess is large enough for permitting the small plate 73' to rock about the stud 86 without fouling the hook 78. Resilient pins such as 87 ensure the locking of the upper small plate 73' against the lower small plate 74'. The whole is maintained in its position by the shell 3a or 4a which rests on the upper small plate. During the moulding of the mask the rubber enters at 82 the space 76 and surrounds the leg 88 of the hook. When the piece is a flat buckle it is not necessary to provide a recess in the upper small plate unless it be for the discharge of excess rubber.

In another embodiment, a cavity 89 can be provided in the lower small plate 74', this cavity being capable of forming a release chamber for the rubber. This prevents the rubber from springing the small plates 73' and 74' away from one another and forming a wall or fin which would be difficult to remove.

It is to be noted that it would be possible, without departing from the scope of the present invention, to operate the above mentioned devices by using rubber or any other natural or synthetic plastic material, injected under pressure into the space provided between the head and the shells, the jaws being brought together and maintained aganst one another by a suitable locking device.

and that the said Letters Patent should be read with this correction therein that the same may conform to the record of the case in the Patent Office.

Signed and sealed this 3rd day of October, A. D. 1944.

[SEAL]

LESLIE FRAZER,
*Acting Commissioner of Patents.*